US012493001B2

(12) United States Patent
Chen

(10) Patent No.: US 12,493,001 B2
(45) Date of Patent: Dec. 9, 2025

(54) DEVICE OF INSPECTING DEFECTS OF WAFER DICED OR ALIGNED

(71) Applicant: YAYATECH CO., LTD., Hsinchu (TW)

(72) Inventor: Chien-Cheng Chen, Hsinchu (TW)

(73) Assignee: YAYATECH CO., LTD., Hsinchu (TW)

( * ) Notice: Subject to any disclaimer, the term of this patent is extended or adjusted under 35 U.S.C. 154(b) by 113 days.

(21) Appl. No.: 18/588,491

(22) Filed: Feb. 27, 2024

(65) Prior Publication Data

US 2025/0027885 A1   Jan. 23, 2025

(30) Foreign Application Priority Data

Jul. 20, 2023   (TW) .................................. 112127064

(51) Int. Cl.
*G01N 21/95* (2006.01)
*G01N 21/88* (2006.01)

(52) U.S. Cl.
CPC ..... *G01N 21/9501* (2013.01); *G01N 21/8806* (2013.01); *G01N 21/8851* (2013.01); *G01N 2021/8835* (2013.01); *G01N 2021/8845* (2013.01); *G01N 2201/0212* (2013.01); *G01N 2201/0618* (2013.01)

(58) Field of Classification Search
CPC ... G01N 2021/8835; G01N 2021/8845; G01N 21/8806; G01N 21/8851; G01N 21/9501; G01N 21/9505; G01N 2201/0212; G01N 2201/0618
See application file for complete search history.

(56) References Cited

U.S. PATENT DOCUMENTS

2005/0052642 A1\* 3/2005 Shibata ............ G01N 21/95623
356/237.1

FOREIGN PATENT DOCUMENTS

TW           I501334 B      9/2015

\* cited by examiner

*Primary Examiner* — Hina F Ayub
(74) *Attorney, Agent, or Firm* — MUNCY, GEISSLER, OLDS & LOWE, P.C.

(57) ABSTRACT

A device of inspecting defects of a wafer diced or aligned, the wafer including, after being diced or aligned, a silicon wafer layer and a blue film affixed to the bottom of the silicon wafer layer, the device including: an immersion liquid detector having a casing, the casing having a transparent lid, allowing a liquid to flow through and fill between the blue film and the transparent lid; a lens assembly disposed in the casing and below the transparent lid; an optical lens assembly disposed in the casing and below the lens assembly; a light source for generating visible light and infrared light; and a visible-light camera and an infrared camera, both adapted to perform imaging on the bottom of the silicon wafer layer.

10 Claims, 6 Drawing Sheets

DEVICE OF INSPECTING DEFECTS OF WAFER DICED OR ALIGNED

BACKGROUND OF THE INVENTION

1. Field of the Invention

The present disclosure relates to wafer inspection technology, and more particularly to an inspection device for performing imaging from below a wafer diced or aligned to inspect defects thereof.

2. Description of Related Art

Conventionally, a wafer comprises a silicon wafer layer and a blue film disposed at the bottom of the silicon wafer layer. In every wafer to be inspected, the silicon wafer layer which has been diced is still disposed on the blue film. Dies on the silicon wafer which has been fully diced are arranged on the blue film and spaced apart by a plurality of gaps. Since the wafer diced or aligned always has a plurality of gaps and thus has to be inspected for the sake of quality control.

Taiwan patent I501334 discloses an immersion liquid replenishing device, replenishing method, and a wafer dicing channel detector for use with the immersion liquid replenishing device. Taiwan patent I501334 is aimed at inspecting defects or gaps on the lower surface of a wafer diced or aligned and using an immersion liquid as a medium for filling between a blue film at the bottom of the wafer and a transparent plate of the detector with a view to enhancing the penetrating rate of light rays to the blue film, performing imaging precisely, and enhancing the inspection efficiency.

However, Taiwan patent I501334 merely discloses how to use a liquid as a medium for filing between the blue film and the transparent plate of the detector but does not disclose any imaging mechanism for use in the aforesaid situation. As a result, when it comes to visible-light imaging, Taiwan patent I501334 is disadvantaged by an inadequately low penetrating rate and a resultant failure to inspect hidden parts. Therefore, it is necessary to devise a technique of performing imaging on the entire wafer according to the intrinsic material characteristic of the wafer to preclude the concealment issue.

BRIEF SUMMARY OF THE INVENTION

It is an objective of the disclosure to provide a device of inspecting defects of a wafer diced or aligned and enable the device to operate in conjunction with an immersion liquid detector to perform imaging on the bottom surface of a wafer with visible light and infrared light and thereby carry out a complete inspection of the wafer.

To achieve the above and other objectives, the disclosure provides a device of inspecting defects of a wafer diced or aligned, the device being adapted to inspect a wafer, the wafer comprising, after being diced or aligned, a silicon wafer layer and a blue film affixed to a bottom of the silicon wafer layer, the device comprising: an immersion liquid detector having a casing, the casing having a through hole disposed at an upper portion of the casing and having a transparent lid for covering the through hole, with the transparent lid disposed below the blue film and spaced apart from the blue film by a predetermined distance, allowing a liquid to flow through and fill between the blue film and the transparent lid; a lens assembly disposed in the casing and disposed below the transparent lid; an optical lens assembly disposed in the casing and disposed below the lens assembly; a light source disposed in the casing and adapted to generate visible light and infrared light, wherein the visible light and the infrared light pass through the optical lens assembly, the lens assembly and the transparent lid before exiting therefrom; a visible-light camera disposed in the casing and adapted to perform imaging on the visible light in the casing through the optical lens assembly after the visible light has entered the casing; and an infrared camera disposed in the casing and adapted to perform imaging on the infrared light in the casing through the optical lens assembly after the infrared light has entered the casing.

Therefore, the device of the disclosure comprises an immersion liquid detector to not only perform imaging on the bottom surface of a wafer with visible light and infrared light and thereby carry out an inspection of the wafer but also achieve imaging of different depths with visible light being of a low penetration rate toward the wafer and infrared light being of a high low penetration rate toward the wafer and thereby carry out a complete inspection of the wafer.

DETAILED DESCRIPTION OF THE INVENTION

The technical features of the disclosure are herein illustrated with preferred embodiments, depicted with drawings, and described below.

Figure 1:
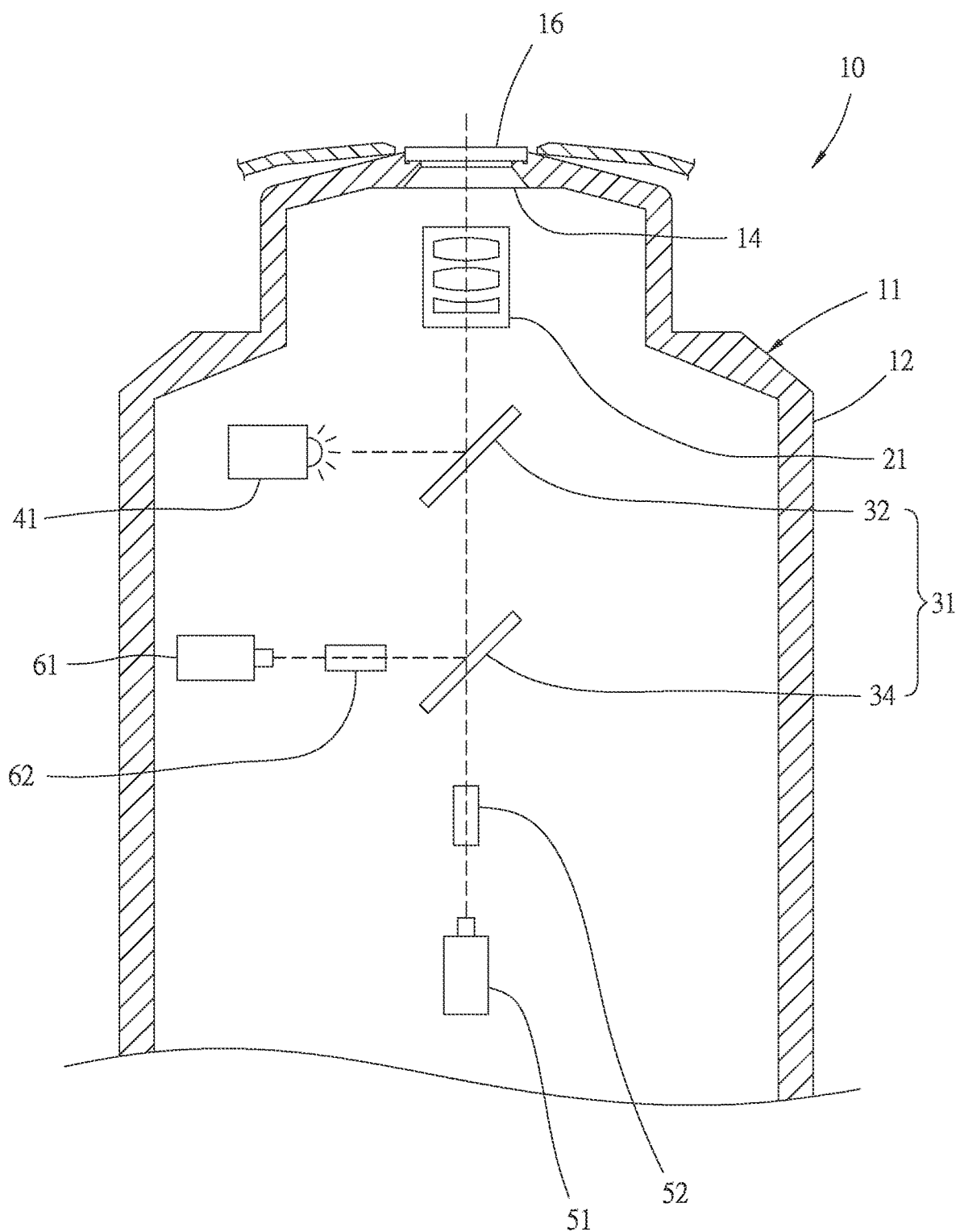
FIG. 1 is a cross-sectional schematic view according to the first preferred embodiment of the disclosure.
Figure 2:
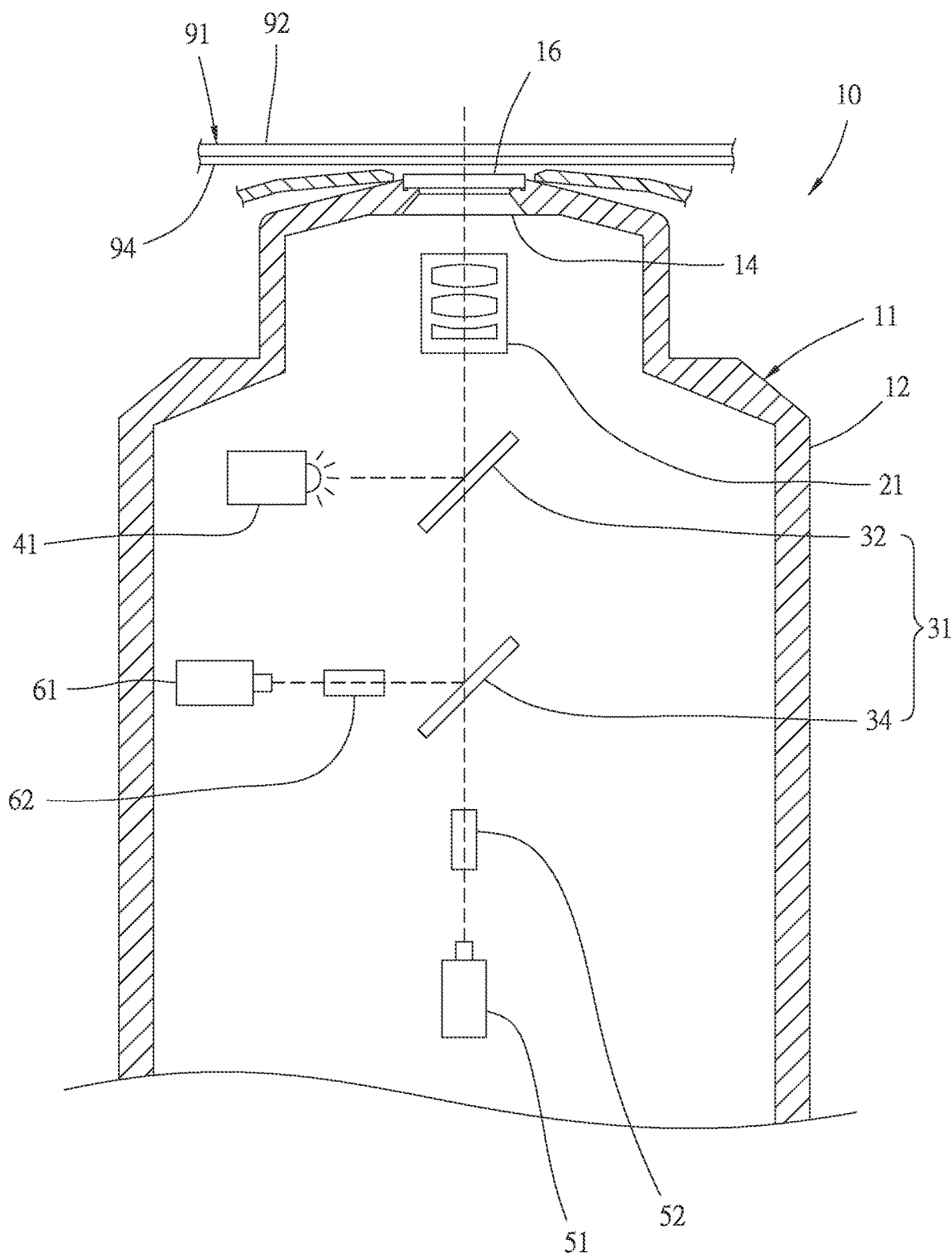
FIG. 2 depicts operation states according to the first preferred embodiment of the disclosure.
Figure 3:
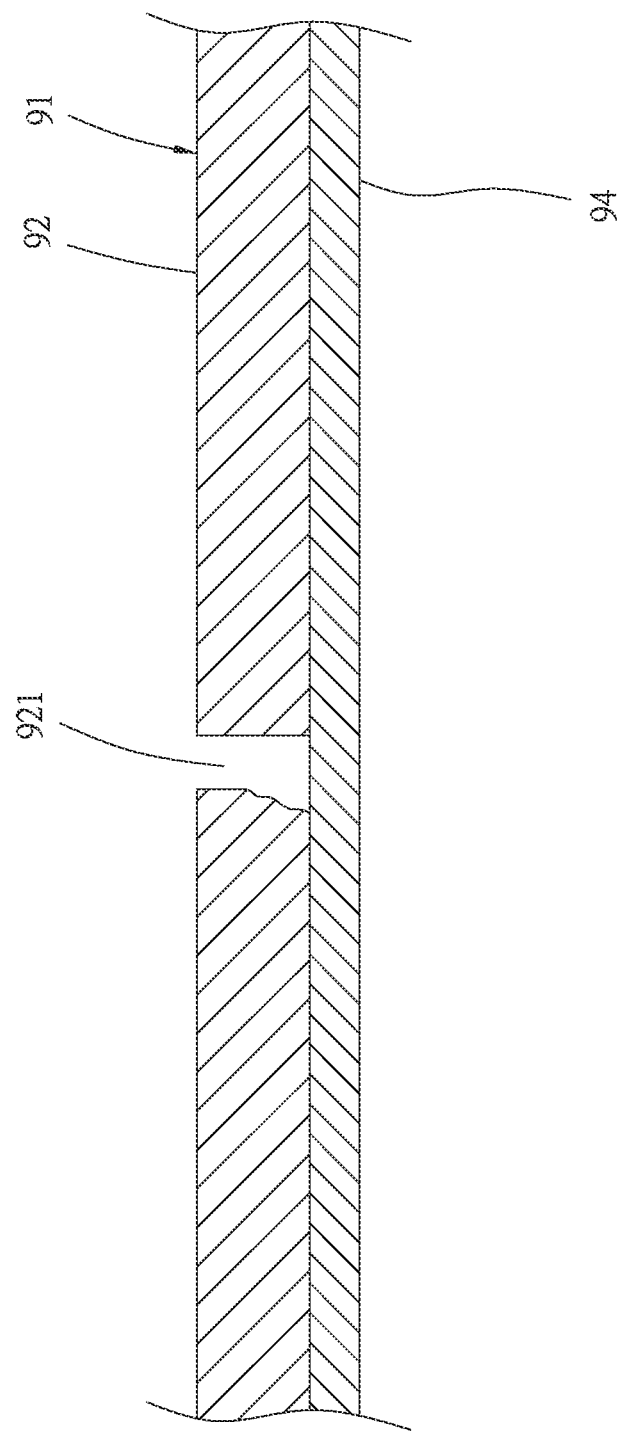
FIG. 3 is a cross-sectional schematic view of a wafer according to the first preferred embodiment of the disclosure.

As shown in FIG. 1 through FIG. 3, a first preferred embodiment of the disclosure provides a device 10 of inspecting defects of a wafer diced or aligned. The device 10 of inspecting defects of a wafer diced or aligned inspects a wafer 91 diced or aligned. After being diced or aligned, the wafer 91 comprises a silicon wafer layer 92 and a blue film 94 affixed to the bottom of the silicon wafer layer 92. The silicon wafer layer 92 has a plurality of gaps 921. The device 10 of inspecting defects of a wafer diced or aligned essentially comprises an immersion liquid detector 11, a lens assembly 21, an optical lens assembly 31, a light source 41, a visible-light camera 51 and an infrared camera 61.

The immersion liquid detector 11 has a casing 12. The casing 12 has a through hole 14 disposed at an upper portion of the casing 12 and has a transparent lid 16 for covering the through hole 14. The inspection process requires the transparent lid 16 to be disposed below the blue film 94 and spaced apart from the blue film 94 by a predetermined distance to allow a liquid (not shown) to flow through and fill between the blue film 94 and the transparent lid 16. The provision mechanism and recycling mechanism of the immersion liquid of the immersion liquid detector 11 are regarded as prior art, and the fact that the liquid functions as a medium flowing through and filling between the blue film 94 and the transparent lid 16 is also regarded as prior art; thus, these technical features are not depicted in the accompanying drawings or reiterated herein.

The lens assembly 21 is disposed in the casing 12 and disposed below the transparent lid 16.

The optical lens assembly 31 is disposed in the casing 12 and disposed below the lens assembly 21. In this first embodiment, the optical lens assembly 31 has a semi-reflective mirror 32 and a beamsplitter 34. Part of the light generated by the light source 41 reflects off the semi-reflective mirror 32 before falling on the lens assembly 21, and the other part of the light generated by the light source 41 penetrates the semi-reflective mirror 32. Incoming light penetrates the transparent lid 16 and the lens assembly 21 before falling on the semi-reflective mirror 32 to partially penetrate the semi-reflective mirror 32 and thus fall on the beamsplitter 34. The beamsplitter 34 is penetrated by visible light but reflects infrared light.

The light source 41 is disposed in the casing 12. In this embodiment, the light source 41 is a halogen lamp for emitting visible light and infrared light that pass through the optical lens assembly 31, the lens assembly 21 and the transparent lid 16 before exiting therefrom. Alternatively, the light source 41 is a mixed light source that is a combination of an infrared light-emitting diode and a visible-light light-emitting diode but is not limited to a halogen lamp.

The visible-light camera 51 is disposed in the casing 12 and adapted to perform imaging on the visible light in the casing 12 through the optical lens assembly 31 after the visible light has entered the casing 12. The visible-light camera 51 faces the beamsplitter 34 and thus performs imaging on the visible light that has penetrated the beamsplitter 34.

The infrared camera 61 is disposed in the casing 12 and adapted to perform imaging on the infrared light in the casing 12 through the optical lens assembly 31 after the infrared light has entered the casing 12. The infrared camera 61 faces the beamsplitter 34 and thus performs imaging on the infrared light that has reflected off the beamsplitter 34.

The visible-light camera 51 and the infrared camera 61 perform imaging, through tube lenses 52, 62, on light rays having reflected off or penetrated the beamsplitter 34 to achieve calibration. The magnifying power of tube lenses need not be defined in the disclosure, because it is well known among persons skilled in the art.

The structural features of the first embodiment of the disclosure are discussed above. The operation states of the first embodiment of the disclosure are explained below.

As shown in FIG. 2, prior to an imaging process, a liquid (not shown) flows through and thus fills between the blue film 94 and the transparent lid 16 at the bottom of the wafer 91. Therefore, if the refractive index of the liquid is substantially equal to that of the transparent lid 16, refraction will greatly decrease to render imaging clearer in the presence of the liquid than in the absence of the liquid—a phenomenon attributed to the prior art and disclosed in the aforesaid Taiwan patent I501334. Thus, the phenomenon is not depicted in the accompanying drawings.

During the imaging process, visible light and infrared light generated by the light source 41 reflect off the semi-reflective mirror 32 to partially penetrate the lens assembly 21 and the transparent lid 16 and exit therefrom to penetrate the blue film 94 and fall on the bottom surface of the silicon wafer layer 92 to reflect off the bottom surface of the silicon wafer layer 92 and penetrate the transparent lid 16 and the lens assembly 21 to penetrate the semi-reflective mirror 32 and then fall on the beamsplitter 34. The visible-light camera 51 and the infrared camera 61 perform imaging on the visible light and the infrared light respectively through the beamsplitter 34.

As shown in FIG. 2 and FIG. 3, the silicon wafer layer 92 is more penetrable to infrared light than visible light. Thus, visible light reflects off the bottom surface of the silicon wafer layer 92 to carry out imaging, whereas infrared light falls on the bottom surface of the silicon wafer layer 92 and partially penetrates the silicon wafer layer 92 to carry out imaging. With infrared light being of a higher medium penetration rate than visible light, infrared images obtained by the infrared camera 61 show the bottom surface of the silicon wafer layer 92 and the interior thereof of a certain degree of depth. When the imaging positions are located at the gaps 921 of the silicon wafer layer 92 diced, infrared images obtained by the infrared camera 61 show two sidewalls of each of the gaps 921 of the silicon wafer layer 92. Therefore, image processing technology can be employed to compare the images obtained by the visible-light camera 51 with the images obtained by the infrared camera 61 to determine whether the edges of the gaps 921 of the silicon wafer layer 92 diced are normal or defective.

Therefore, according to the disclosure, the bottom surface of the wafer 91 undergoes imaging with the visible light and the infrared light through the immersion liquid detector 11 placed below the wafer 91 so as to perform inspection and thus attain more complete inspection results.

Figure 4:
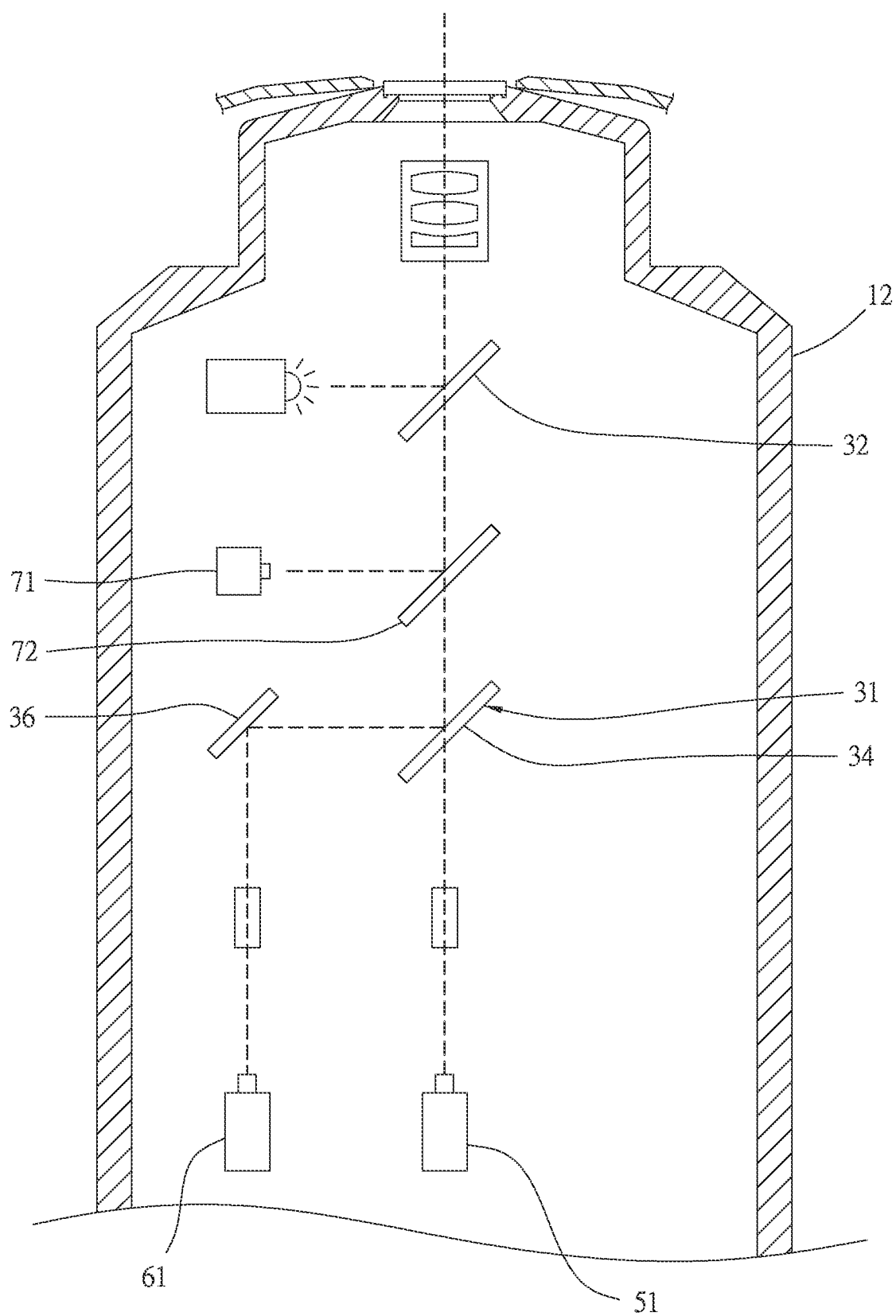
FIG. 4 is a cross-sectional schematic view upon completion of addition of components according to the first preferred embodiment of the disclosure.

As shown in FIG. 4, the optical lens assembly 31 is further provided with a reflecting mirror 36 and adapted to reflect the infrared light that has reflected off the beamsplitter 34 and thus change the direction of propagation of the infrared light. Therefore, the imaging directions of the infrared camera 61 and the visible-light camera 51 change from the aforesaid perpendicular relation to a parallel relation. Moreover, to meet auto-focusing requirements, an auto-focusing laser source 71 is disposed in the casing 12 and adapted to emit a laser beam. The laser beam reflects off a laser beamsplitter 72 to fall on the lens assembly 21. The laser beamsplitter 72 is penetrable by visible light and infrared light. Therefore, the auto-focusing laser source 71 and the laser beamsplitter 72 do not affect the propagation and imaging of the visible light and the infrared light but enhance the auto-focusing effect.

In a variant embodiment, the beamsplitter 34 of the optical lens assembly 31 is replaced with a semi-reflective mirror. Since the visible-light camera 51 does not receive infrared light, the semi-reflective mirror in the variant embodiment partially reflects the light and is partially penetrated by the light to allow one of reflecting light and the penetrating light to enter the visible-light camera 51 and thus perform imaging on visible light only but allow the other one of reflecting light and the penetrating light to enter the infrared camera 61 and thus perform imaging on infrared light only. The aforesaid replacement can be easily inferred by referring to FIG. 1 and FIG. 2, and thus it is not depicted by the accompanying drawings for the sake of brevity.

Figure 5:
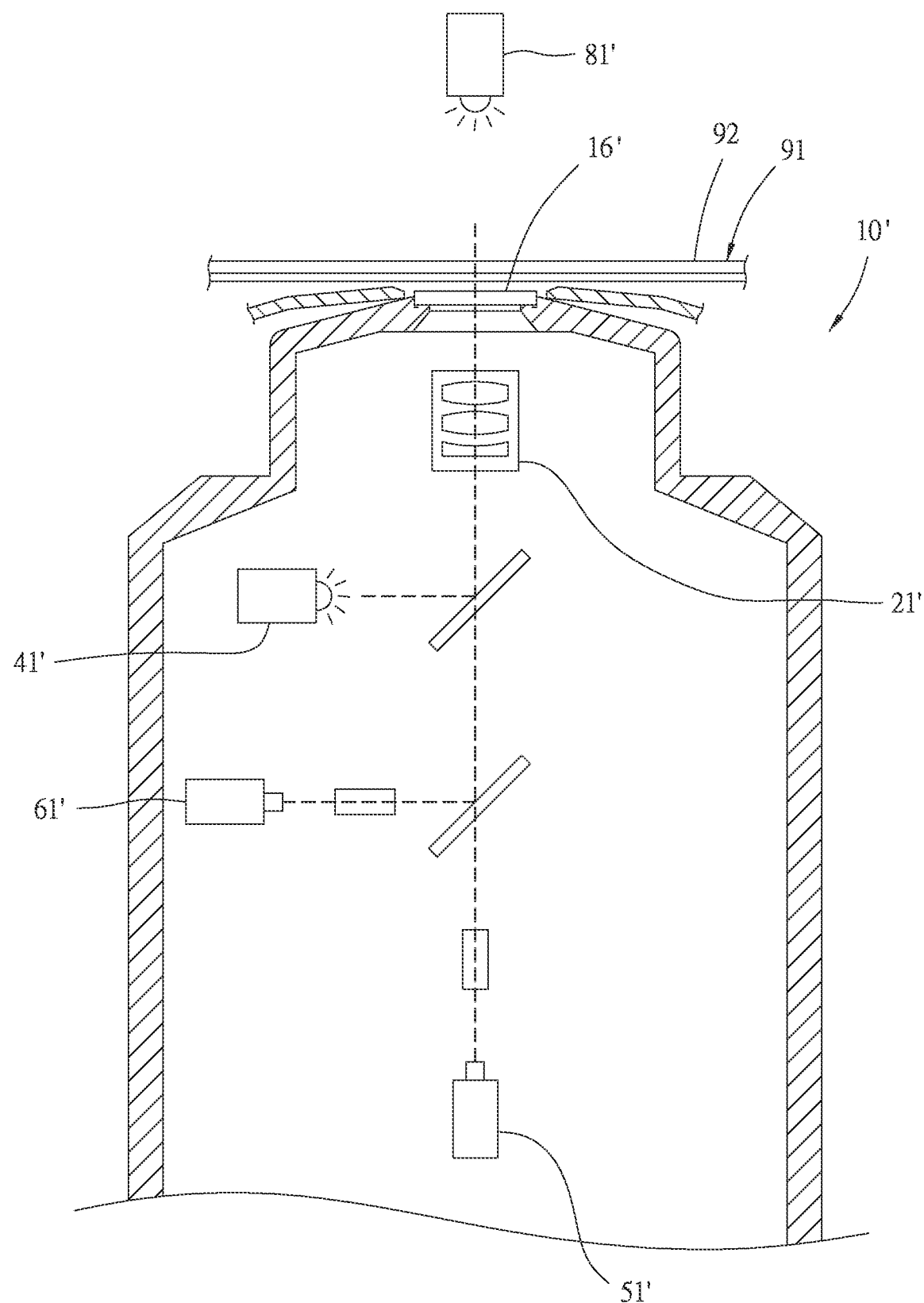
FIG. 5 is a cross-sectional schematic view according to the second preferred embodiment of the disclosure.

As shown in FIG. 5, a second preferred embodiment of the disclosure provides a device 10' of inspecting defects of a wafer diced or aligned and is distinguished from the first preferred embodiment of the disclosure by the distinguishing technical features described below.

In the second embodiment, the device 10' of inspecting defects of a wafer diced or aligned further comprises an upper light source 81'. The upper light source 81' is a halogen lamp disposed above the wafer 91 and emits light, including visible light and infrared light. The light emitted from the upper light source 81' propagates downward and toward the transparent lid 16' and the lens assembly 21'. The upper light source 81' can also be a mixed light source that is a combination of an infrared light-emitting diode and a visible-light light-emitting diode but is not limited to a halogen lamp.

Figure 6:
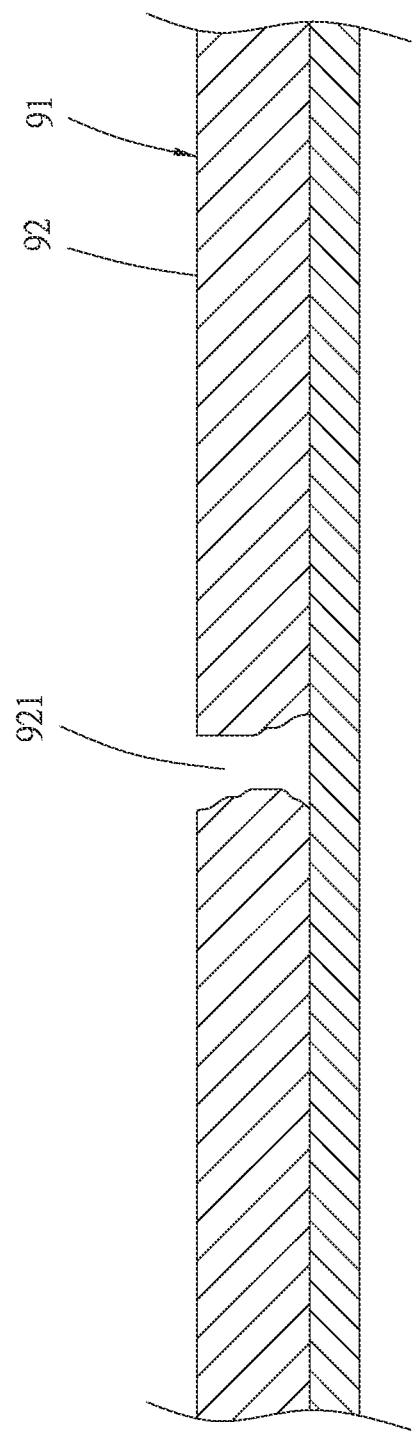
FIG. 6 is a cross-sectional schematic view of a wafer according to the second preferred embodiment of the disclosure.

As shown in FIG. 5 and FIG. 6, owing to the aforesaid structural features, during the inspection process, the light emitted from the upper light source 81' falls on the gaps 921 of the silicon wafer layer 92 diced. From the perspective of the visible-light camera 51' and the infrared camera 61', the light penetrating the gaps 921 is a backlight. Thus, it is feasible to turn off the light source 41' but turn on the upper light source 81' to perform imaging and obtain images in a backlight mode, capturing visible-light backlight images and infrared backlight images in the backlight mode. Thus, the visible-light backlight images can be solely obtained by using the upper light source 81' which is a visible-light light source instead of a halogen lamp, whereas the infrared backlight images can be solely obtained by using the upper light source 81' which is an infrared light source.

The other technical features and achievable advantages of the second embodiment are substantially the same as those of the first embodiment and thus are, for the sake of brevity, not reiterated herein.

The disclosure is disclosed above by embodiments. The embodiments are illustrative of the disclosure but shall not be interpreted as restrictive of the scope of the claims of the disclosure. Thus, all simple variations or equivalent implementation carried out to the aforesaid embodiments according to the claims and detailed description of the disclosure shall be deemed falling within the scope of the claims of the disclosure.

What is claimed is:

1. A device for inspecting defects of a wafer diced or aligned, the device being adapted to inspect a wafer, the wafer comprising, after being diced or aligned, a silicon wafer layer and a blue film affixed to a bottom of the silicon wafer layer, the device comprising:
    an immersion liquid detector having a casing, the casing having a through hole disposed at an upper portion of the casing and having a transparent lid for covering the through hole, with the transparent lid disposed below the blue film and spaced apart from the blue film by a predetermined distance, allowing a liquid to flow through and fill between the blue film and the transparent lid;
    a lens assembly disposed in the casing and disposed below the transparent lid;
    an optical lens assembly disposed in the casing and disposed below the lens assembly;
    a light source disposed in the casing and adapted to generate visible light and infrared light, wherein the visible light and the infrared light pass through the optical lens assembly, the lens assembly and the transparent lid before exiting therefrom;
    a visible-light camera disposed in the casing and adapted to perform imaging on the visible light in the casing through the optical lens assembly after the visible light has entered the casing; and
    an infrared camera disposed in the casing and adapted to perform imaging on the infrared light in the casing through the optical lens assembly after the infrared light has entered the casing.

2. The device of claim 1, wherein the optical lens assembly has a semi-reflective mirror and a beamsplitter, part of the light generated by the light source reflects off the semi-reflective mirror before falling on the lens assembly, the other part of the light generated by the light source penetrates the semi-reflective mirror, incoming light penetrates the transparent lid and the lens assembly before falling on the semi-reflective mirror to partially penetrate the semi-reflective mirror and thus fall on the beamsplitter; the beamsplitter is penetrable by one of the visible-light and the infrared light but reflects the other one, allowing the visible light to enter the visible-light camera for imaging and allowing the infrared light to enter the infrared camera for imaging.

3. The device of claim 2, wherein the optical lens assembly further has a reflecting mirror for reflecting light rays having reflected off the beamsplitter and thus changing direction of propagation of the light rays.

4. The device of claim 1, wherein the optical lens assembly has two semi-reflective mirrors, part of the light generated by the light source reflects off one of the semi-reflective mirrors before falling on the lens assembly, the other part of the light generated by the light source penetrates the semi-reflective mirror, incoming light penetrates the transparent lid and the lens assembly before falling on the semi-reflective mirror to partially penetrate the semi-reflective mirror and thus fall on the other one of the semi-reflective mirrors, wherein the light partially reflects off and partially penetrates the other one of the semi-reflective mirrors, so as for one of the reflecting light and the penetrating light to enter the visible-light camera for imaging and the other one of the reflecting light and the penetrating light to enter the infrared camera for imaging.

5. The device of claim 4, wherein the optical lens assembly further has a reflecting mirror for reflecting light rays having reflected off the other semi-reflective mirror and thus changing direction of propagation of the light rays.

6. The device of claim 1, wherein the light source is a halogen lamp.

7. The device of claim 1, further comprising an upper light source disposed above the wafer and adapted to emit light, including visible light and infrared light, at least including visible light, the emitted light propagating downward and toward the transparent lid and the lens assembly.

8. The device of claim 7, wherein the upper light source is a halogen lamp.

9. The device of claim 1, further comprising an autofocusing laser source disposed in the casing and adapted to emit a laser beam, the laser beam reflecting off a laser beamsplitter to fall on the lens assembly, the laser beamsplitter being penetrable by visible light and infrared light.

10. The device of claim 1, wherein the visible-light camera and the infrared camera perform imaging through tube lenses respectively on light rays having reflected off or penetrated the optical lens assembly.

* * * * *